United States Patent [19]

Muirhead et al.

[11] Patent Number: 5,642,798

[45] Date of Patent: Jul. 1, 1997

[54] ELECTROMAGENTIC COMPRESSOR CLUTCH WITH COMBINED TORQUE CUSHION AND ARMATURE COOLING

[75] Inventors: Hugh James Muirhead; Richard Lee Marker, both of Lockport, N.Y.

[73] Assignee: General Motors Corporation, Detroit, Mich.

[21] Appl. No.: 620,187

[22] Filed: Mar. 22, 1996

[51] Int. Cl.[6] .................................................. F16D 27/06
[52] U.S. Cl. ............................. 192/84.961; 192/113.23; 192/209
[58] Field of Search ........................ 192/84.961, 209, 192/113.23

[56] References Cited

U.S. PATENT DOCUMENTS

| | | | |
|---|---|---|---|
| 2,982,385 | 5/1961 | Gamundi | 192/84 |
| 3,055,475 | 9/1962 | Pitts, Jr. | 192/84 |
| 4,296,851 | 10/1981 | Pierce | 192/84 |
| 4,337,855 | 7/1982 | Bennett | 192/84 |
| 4,493,407 | 1/1985 | Newton | 192/84 |
| 4,575,930 | 3/1986 | Koitabashi | 192/84.961 |
| 4,616,742 | 10/1986 | Matsushita | 192/84 |
| 4,624,354 | 11/1986 | Koitabashi | 192/84.961 |
| 4,635,774 | 1/1987 | Sekiguchi et al. | 192/52 |
| 5,046,594 | 9/1991 | Kakinuma | 192/84 |
| 5,119,915 | 6/1992 | Nelson | 192/106.1 |
| 5,138,293 | 8/1992 | Isimaru | 192/84.961 |
| 5,141,090 | 8/1992 | Trojan | 192/84.961 |
| 5,370,209 | 12/1994 | VanLaningham et al. | 192/106.1 |
| 5,390,774 | 2/1995 | Thurston et al. | 192/106.1 |

*Primary Examiner*—Andrea L. Pitts
*Attorney, Agent, or Firm*—Patrick M. Griffin

[57] ABSTRACT

An electromagnetic clutch for an automotive air conditioning compressor supports the armature co axial to, and facing, a pulley friction disk with a novel support structure that self cools the armature, as well as providing a torque cushion. A multi lobed drive plate is welded to a compressor shaft mounted hub, while a similarly shaped armature support disk turns freely on the outer surface of the hub, supporting armature rings on spring fingers co axial and parallel to a belt driven pulley friction disk. The lobes of the drive plate and support disk are aligned in three pairs, with a significant axial gap between, and extend radially over the entire outer face of the armature rings, while leaving most of the outer face exposed to the ambient air. A layer of resilient elastomer is bonded between the aligned lobes of the drive plate and support disk, holding them together, limiting the degree to which the support disk can twist on the hub, and cushioning the shock of initial engagement. The elastomer layer is thick enough that the leading edges thereof disturb ambient air as the rotate, drawing air in and over the armature rings in fan like fashion to cool them.

3 Claims, 3 Drawing Sheets

Page 1

ELECTROMAGENTIC COMPRESSOR CLUTCH WITH COMBINED TORQUE CUSHION AND ARMATURE COOLING

This invention relates to automotive air conditioning compressor electromagnetic clutches in general, and specifically to such a clutch which has a built in provision for cooling the clutch armature.

BACKGROUND OF THE INVENTION

Almost all automotive air conditioning clutches are powered by a belt driven pulley, a pulley that freely rotates about the drive shaft of the compressor until an annular iron armature is pulled, by an electromagnetic coil, against a friction disk of the pulley with enough force to cause the two to stick frictionally together. The armature, in turn, is physically supported on a central hub of the compressor drive shaft by an armature support mechanism that holds the armature coaxially to and spaced away from the pulley friction disk, close enough to be pulled into and against it when the clutch is actuated. The armature support mechanism must be radially and circumferentially rigid enough to successfully transfer drive torque from the co rotating pulley and armature to the shaft. It also must be axially flexible and resilient enough to allow the armature to be pulled toward and then rebound from the pulley as the clutch rams on and off. Ideally, the armature would be supported on the shaft hub by a mechanism that not only transferred torque and provided axial flexibility, but which also provided a measure of torsional flexibility and resilience, enough to at least cushion the initial shock of armature engagement with the pulley. The torsional flexibility in known torque cushions often is reflected in a radial flexibility that jeopardizes the radial alignment of the armature, however. The initial armature engagement not only creates a rapid spike in torque that needs cushioning, it is also accompanied by a degree of initial rubbing and slippage between the outer face of the pulley friction disk and the inner face of the armature, before the two completely stick together. This creates a good deal of heat and, with heat, extra rubbing wear. No special provision is made, in known armature support mechanisms, to cool the armature, and many actually retard its cooling.

The typical armature support mechanism consists simply of a rigid drive plate welded to the compressor drive shaft hub, and three or more simple leaf springs riveted at one end to the drive plate, and at the other end to the armature. The leaf springs lie in a plane parallel to the drive plate, and are fairly rigid in that plane, capable of transferring torque between the armature and drive plate, and ultimately to the compressor drive shaft. But the springs can flex easily in the axial direction, in cantilever fashion, since they are thin in the axial direction. Examples may be seen in several issued patents, for example, U.S. Pat. No. 5,046,594 to Kakinuma, where armature 26 is joined to a hub mounted drive plate 28 by three thin leaf springs 27. This is a very common design. The drive plate 28, in such a design, is typically round, or triangular, as in U.S. Pat. No. 4,337,855, and is usually uninterrupted by any large holes or voids, except where the ends of the leaf springs are riveted to it. Although the drive plates may be small enough to leave some of the area of outer face of the armature exposed to ambient air, and therefore able to cool passively by radiation, the leaf springs are so thin that their edges would not disturb enough air as they spun to act as fan blades would to actively cool the outer face of the armature. Nor would the drive plate itself provide any fanning action per se, both because of its size and shape. There is no recognition in such designs that the drive plate or leaf springs could or should do any more than flexibly support the armature and transfer torque.

A similar design may be seen in U.S. Pat. No. 4,296,851, with a typically round drive plate 53, but with C shaped leaf springs, rather than straight. Some designs, such as that shown in U.S. Pat. No. 2,982, 385, use a spring disk 54 riveted to a drive plate 52, rather than individual springs, while others, such as that shown in U.S. Pat. No 3,055,475, use a single disk with individual spring members stamped integrally out of it. These designs still provide no fanning action to cool the armature and, in some cases, actually cover most or all of the outer face of the armature so as to retard it's cooling. One design, shown in U.S. Pat. No. 5,119,915, has a leaf spring mount that consists of three short, radial arms 42 that are formed integrally with the central hub, rather than a flat drive plated welded to the hub. Thin leaf springs are attached to the arms 42. While the arms 42 would create some paddling of air, they do not extend out radially far enough over the armature that they would fan any significant air over it to cool it. Again, this is not surprising, since there is no recognition that the armature support and spring mechanism could or should do anything to cool the face of the armature.

A significantly different approach to supporting the armature is to combine the drive plate and springs into a single axially flexible disk or plate, which completely, or almost completely, covers the outer face of the armature. This has the advantage of eliminating parts, and, in the case where the plate itself is made of a torsionally resilient material, provides a torque cushion. It essentially eliminates any potential for cooling the face of the armature, however, and in fact would insulate and retard it from cooling. Again, this is not surprising, since there is no apparent recognition that the armature support could also cool the armature that it supports. An example of such a design may be seen in U.S. Pat. No. 5,370,209, where a hard plastic disk covers the entire face of the armature. Another design, shown in U.S. Pat. No. 5,390,774, covers almost the entire face of the armature with a thick rubber cushion.

SUMMARY OF THE INVENTION

The invention provides an armature support which, although it uses a metal drive plate and metal leaf springs to mount the armature, also provides an adequate torque cushion, with all parts combined into a unique mechanism that can also effectively cool the outer face of the armature as it operates. Furthermore, the drawbacks of typical torque cushioning structures are avoided.

In the preferred embodiment disclosed, an iron armature includes three concentric annular rings with inner faces axially opposed to a coaxial pulley friction disk, and outer faces exposed to ambient air. The armature rings are supported in this operative position by a thin steel support disk, which has an inner edge piloted closely on a shaft mounted cylindrical hub, and three relatively narrow, evenly spaced lobes that radiate therefrom. Each lobe, in turn, has three curved spring fingers that extend circumferentially therefrom in a clockwise direction. Each set of three co radial spring fingers is riveted to one of the three concentric armature rings. A drive plate of heavier gage metal basically matches the support disk in shape, except for the spring fingers, with an inner edge welded to the hub and three lobes that overlay, but are axially spaced from, the armature support disk lobes. In addition, in the embodiment disclosed, the drive plate lobes are slanted and increase their axial gap relative to the support disk lobes as they radiate out. In this axial gap, an adhering layer of resilient elastomer is injection molded, binding the three aligned pairs of lobes together, while leaving most of the area of the armature ring outer faces exposed to the ambient air. The three edges of the elastomer layer that face in the clockwise direction, and which will therefore be leading edges when they rotate, have a significant axial thickness, one that extends radially continuously over almost the entire outer face of the armature rings, and which increases in axial thickness moving radially outwardly.

In operation, when the clutch coil is activated, the three stationary armature rings are pulled toward the pulley friction disk, which is rapidly spinning clockwise. When the inner faces of the three armature rings hit the rapidly spinning pulley, several things happen concurrently. The inner faces of the armature rings scrub against the pulley friction disk for a short time, generaring significant heat. As this initial contact occurs, the layer of rubber between the drive plate and support disk lobes is put into shear, absorbing the shock of engagement. The increasing axial thickness of the layer assures that more elastomer material is present where the degree of shear is greatest, toward the radial outermost extent of the lobes. When the armature rings stop scrubbing on and stick to pulley, the lobes begin to spin as well, and torque is transferred through the drive plate to the compressor shaft. The leading edges of the elastomer layer disturb ambient air as they spin, in fan like fashion, throwing air radially outwardly over the outer faces of the armature rings, and pulling more ambient air axially in. This cools the armature rings actively, dissiparing the heat just generated from rubbing. Given the increasing axial thickness of the rubber layer, the leading edges are thickest where the surface speed is greatest, which assists in the cooling action, as well as evening out the shear forces at engagement.

DESCRIPTION OF THE PREFERRED EMBODIMENT

These and other features of the invention will appear from the following written description, and from the drawings, in which.

Figure 1:
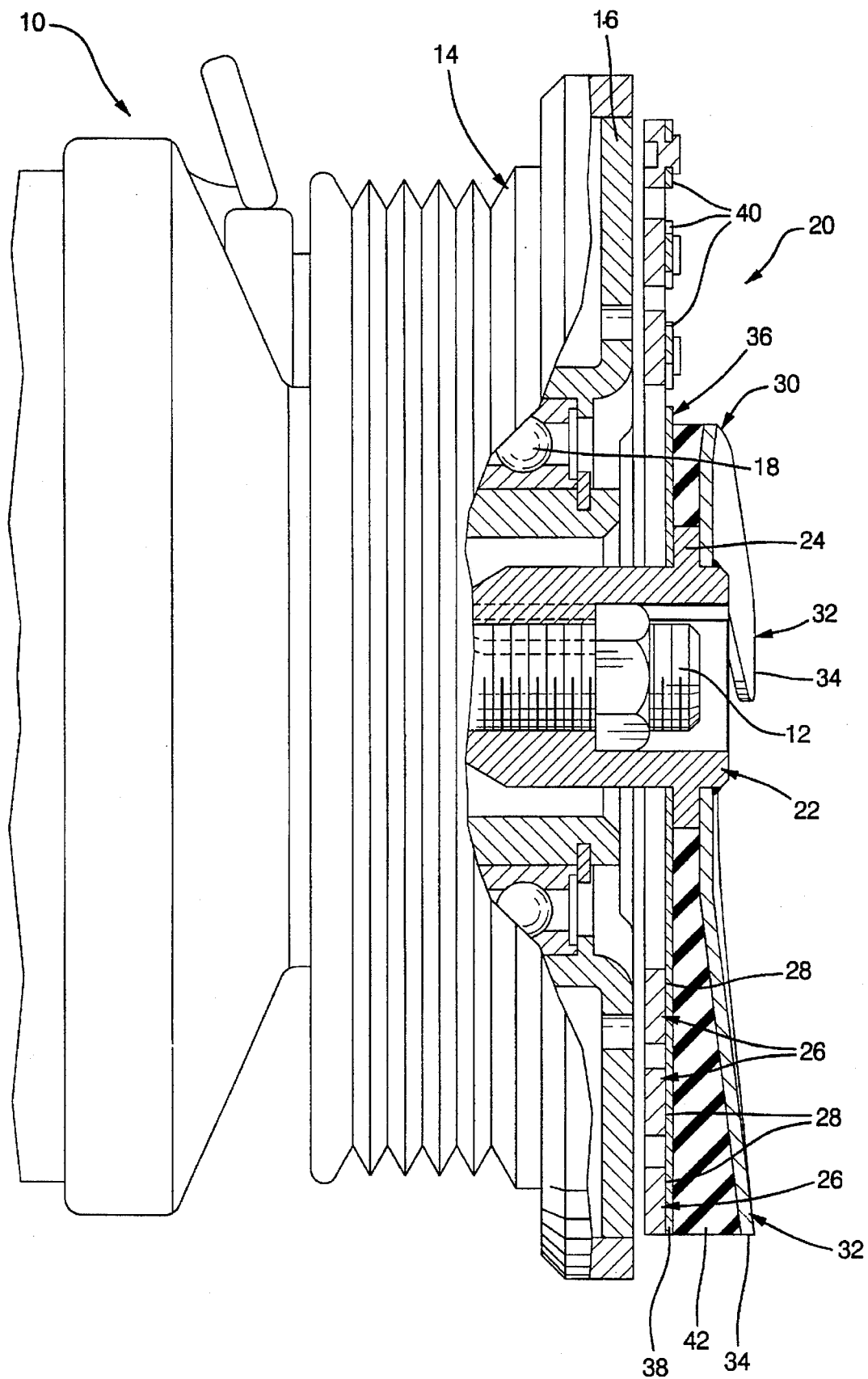
FIG. 1 is a cross section of the clutch assembly of the invention, showing the compressor housing and part of the pulley broken away.
Figure 2:
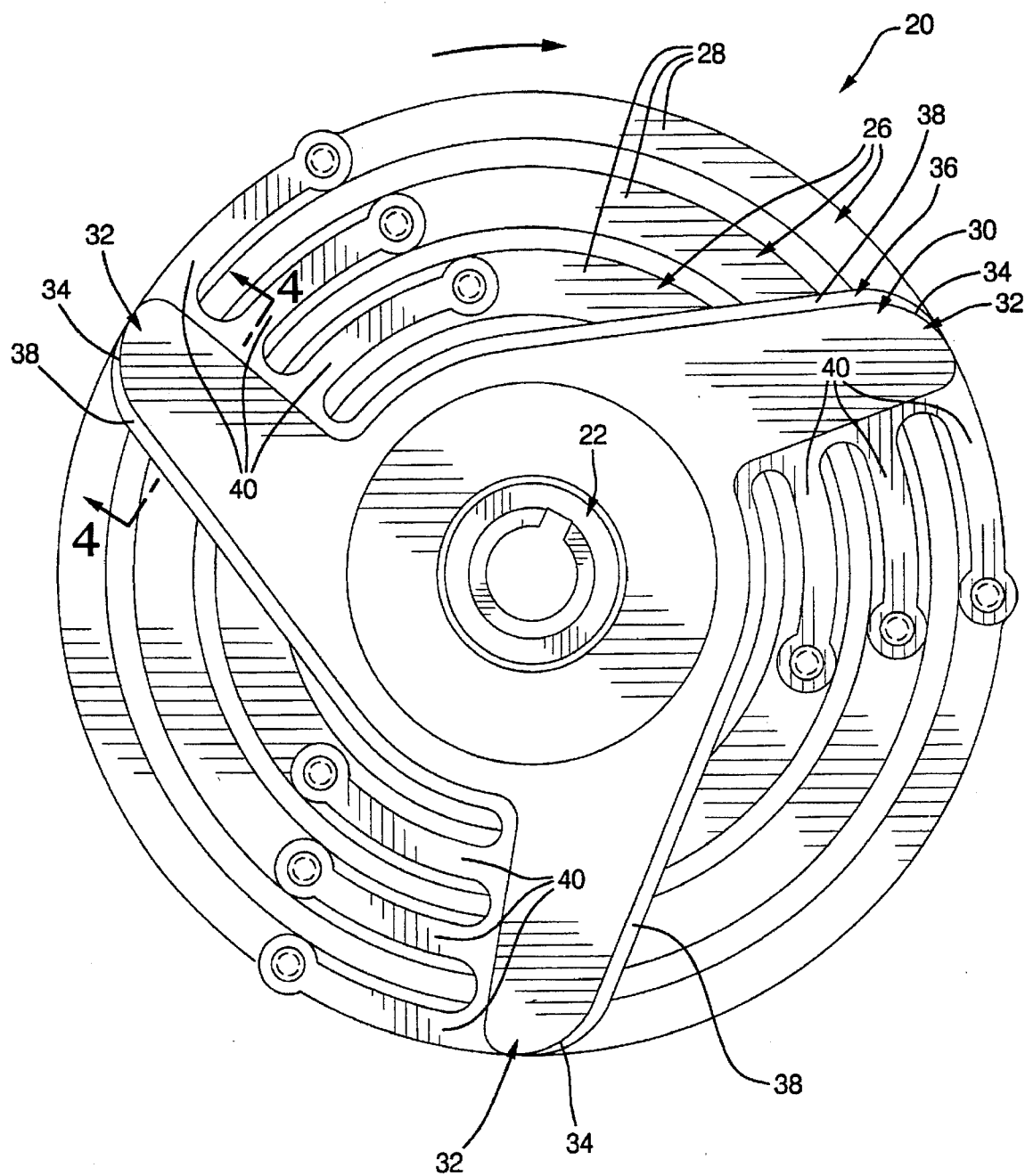
FIG. 2 is a plan view of the clutch assembly alone, looking axially inwardly.

Referring first to FIGS. 1 and 2, an automotive air conditioning system compressor, indicated generally at 10, has a central drive shaft 12 that is powered, indirectly, through an engine belt driven pulley 14. Pulley 14 supports a generally iron or steel friction disk 16 coaxial to, and in a plane perpendicular to, the axis of drive shaft 12. Inboard of pulley 14 is a non illustrated, conventional electromagnetic coil which, when actuated, produces a magnetic flux field in front of disk 16 capable of pulling inwardly any sufficiently nearby ferrous object. Pulley 14 rams freely on a ball bearing 18 until such time as the clutch assembly of the invention, a preferred embodiment of which is indicated generally at 20, closes to make a connection between pulley 14 and shaft 12. Clutch assembly 20 makes that connection in such a way as to both cushion the shock of initial engagement, and so as to dissipate the heat that results.

Referring next to FIGS. 1 and 2, clutch assembly 20 includes a basically cylindrical central hub 22, which is bolted to the end of shaft 12. Hub 22 has an annular shoulder 24 inset axially from the outer end, which is flat on both sides and approximately an eighth of an inch thick and approximately a quarter to three eighths inch wide. The armature is not a unitary piece, as is often the case, but instead is made up of three independent, concentric armature rings 26, each of which axially faces the pulley disk 16, while the outer faces 28, or at least the majority of the surface area thereof, are exposed to the ambient air. The outermost edge of the outermost ring 26 has a radius of approximately two and three tenths inches. The armature rings 26 are joined to the hub 22 in an operative position, that is, coaxial to the pulley disk 16 and axially spaced therefrom at a predetermined gap of about twenty thousandths of an inch. In the operative position, the armature rings 26 are ready to be electromagnetically pulled against pulley disk 16 when the clutch assembly 20 is actuated. At that point, the armature rings 26 can eventually stick to and turn one to one with the pulley disk 16, so as to transfer torque to shaft 12. The armature here could be a single piece, and, in fact, is initially stamped as a single piece with thin webs interconnecring the three rings, so that it can be handled as a unit. Essentially every clutch assembly has both an armature, which may be single or multi piece, and a central hub that is bolted or otherwise joined to the shaft. The rest of the clutch assembly consists of the structure that fixes the armature to the hub. Here, the structure that provides this support and driving connection consists of three relatively simple components, described next.

Still referring to FIGS. 1 and 2, a multi lobed, steel drive plate, indicated generally at 30, has an inner edge welded to the outer side of hub shoulder 24, and three lobes 32 that radiate outwardly therefrom. The lobes 32 are relatively thin, about seventy three thousandths of an inch thick, and relatively narrow in the circumferential direction, approximately seven tenths of an inch wide on average, tapering in width slightly out to their farthest tips 34. The tips 34 are substantially co- radial with the outermost edge of the outermost armature ring 26. The drive plate lobes 32 also do not lie in a plane, but slope axially outwardly slightly from a circular line near the hub shoulder 24 all the way to the tips 34, at a constant shallow angle of about five or six degrees. Abutted with the other side of hub shoulder 24 is a thinner, spring steel armature support disk, indicated generally at 36, which is approximately thirty thousandths of an inch thick. Support disk 36 has an inner edge that pilots closely on hub 22, and three lobes 38 that radiate outwardly therefrom, in alignment with the drive plate lobes 32. The support disk lobes 38 are generally congruent to, that is, have the same shape and length as, the drive plate lobes 32, but are slightly wider. The support disk lobes 38 are also co-planar and flat, rather than slanted. Therefore, when the drive plate 30 and support disk 36 are aligned and abutted with opposite sides of the hub shoulder 24, there is an axial space formed therebetween that increases, moving radially outwardly, from the same thickness as hub 22 to approximately three tenths of an inch at the drive plate tips 34. Each support disk lobe 38 has three integral, semi annular spring fingers 40 extending circumferentially therefrom, each co radial with, and riveted to, a respective armature ring 26. As such, the armature support disk 36, if it is maintained in abutment with the hub shoulder 24, will, in turn, maintain the armature rings 26 coaxial to the pulley disk 16, as well as axially spaced therefrom by the correct gap. However, there is nothing directly fixing the support disk 36 to hub 22. Instead, it is indirectly fixed in place, as described next.

Figures 3, 4:
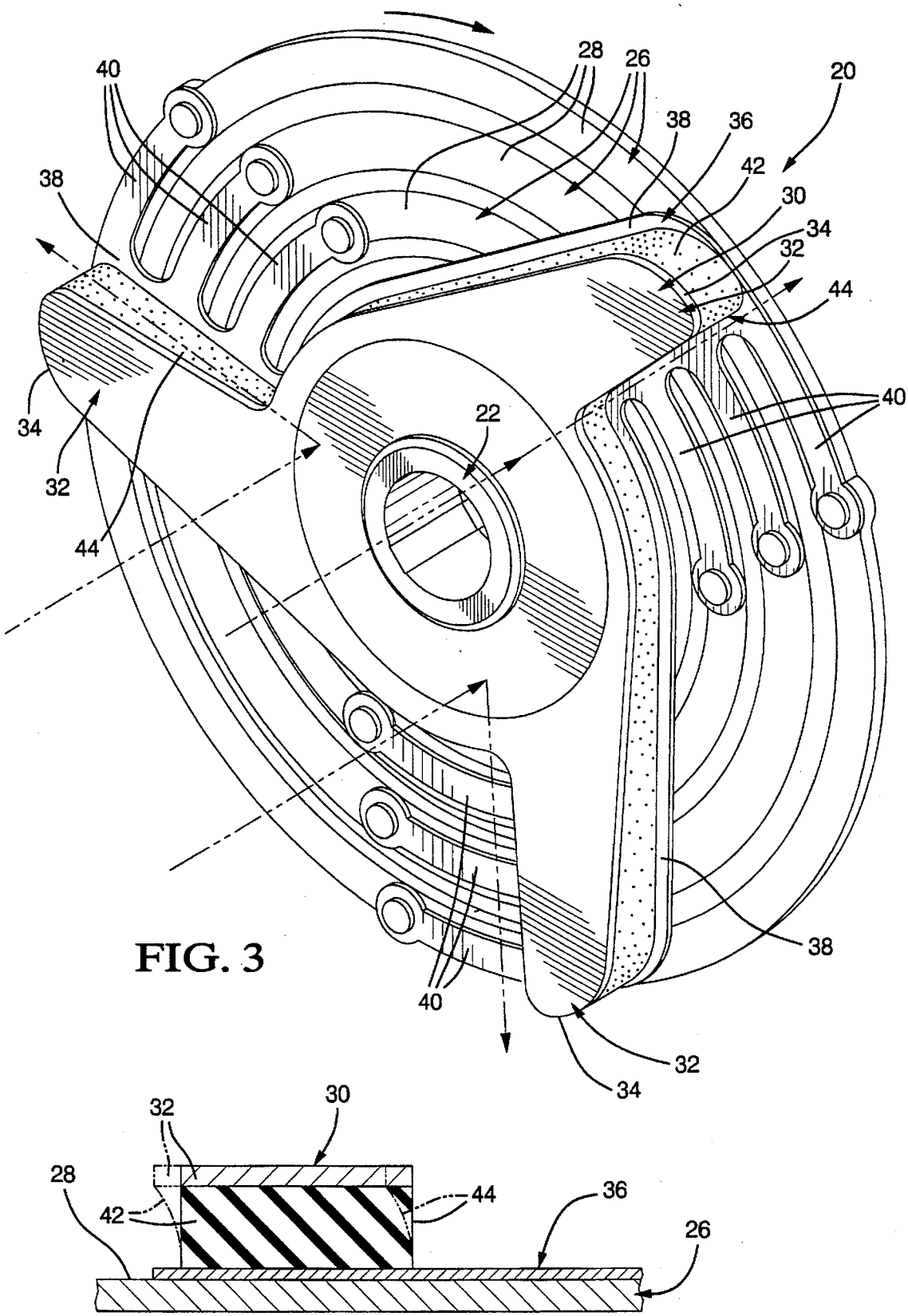
FIG. 3 is a perspective view of the clutch assembly alone, schematically indicaring the air flow as it rotates.
FIG. 4 is a cross section of one set of lobes and the elastomer layer therebetween, taken along the line 4—4 of FIG. 2, showing, in dotted lines, the shear force reaction caused by initial clutch engagement.

Referring next to FIGS. 1 and 4, once the drive plate 30 is welded to the hub 22, then they and the support disk 36 are held in a suitable mold that clamps the support disk against the inside of the hub shoulder 24, with the three pairs of lobes 32 and 38 aligned. Then, a layer 42 of elastomer material, such as nitrile rubber of the like, is injection molded between them. The support disk lobes 38 are just enough wider than the drive plate lobes 32 to provide sufficient area for the molds to engage and close off against, confining the elastomer 42 between the inner surfaces of the aligned lobes 32 and 38, to which it strongly adheres, but no material gets between the support disk 36 and the shoulder 24. After molding, the rings 26 are riveted to the fingers 40, after which the webs initially interconnecring them may be broken out. All of the various components of the clutch assembly 20 are then held together, and may be handled and bolted to drive shaft 12 as a complete unit. The elastomer layer 42 completely fills the axial space between the aligned lobe pairs 32 and 38, and therefor presents radially extending, continuous edges, generally perpendicular to the armature ring outer faces 28. These layer edges have a significant axial thickness, much greater than the thickness of the material from which either the drive plate 30 or armature support disk 36 are formed. The three elastomer layer edges 44 that face clockwise may be termed leading edges, since the pulley 14 rotates clockwise. In operation, when the coil is energized to pull the armature rings 26 axially inwardly, the layer 42 is sufficiently thick and rigid in the axial direction to in turn hold the support disk lobes 38 rigidly to the stiffer drive plate lobes 32. Therefore, only the spring fingers 40 bend significantly, without deforming, but allowing the clutch rings 26 to hit the pulley friction disk 16. At that point, the inner faces of the rings 26 will scrub and slip against the pulley disk 16 for some time until they stick together and turn one to one, which pulls on the spring fingers 40 and pulls the armature support disk 36 along in a clockwise rotation. The elastomer layer 42 is sufficiently wide in the circumferential direction to be strong enough to transfer torque between the support disk 36 and the drive plate 30, and ultimately to the drive shaft Concurrently with initial contact, as shown in FIG. 4, the elastomer layer 42 shears slightly, allowing the support disk 36 to twist slightly on the hub 22, and cushioning the initial shock of engagement. The shearing force twists the layer 42 slightly, without delamination, and since the degree of twist is greatest toward the tips 34, the proportionally greater thickness of the layer 42 at that location helps to keep the shear stress even throughout. In addition, the close piloring of the inner edge of the armature support disk 36 on the outer surface of the hub 22 as the layer 42 shears maintains both the disk 36 and the armature rings 26 coaxial to shaft 12. The resilience of the layer 42 that creates the cushioning effect does not, therefore, jeopardize the radial alignment of the rings 26. Most torque cushions in known clutch assemblies, as described above, provide a similar torque cushioning effect, although they do not have the same strict radial guidance of the armature rings 26, or the same provision to even out the twisring shear stress. The resilience and flexibility of the layer 42, which has a durometer hardness in the range of about sixty to eighty, also serves to dampen out resonant vibrations that the compressor 10 may experience in operation. However, the elastomer layer 42 here also provides an entirely new function.

Referring next to FIG. 3, the initial scrubbing between pulley disk 16 and armature rings 26 creates a good deal of frictional heat, in the same way that brake pads are heated. In known clutch assemblies, especially those that provide torque cushioning, the armature may be entirely or mostly covered shielded form the ambient air. Often, this covering is deliberate, so as to provide acoustic shielding and dust exclusion. However, it also acts to prevent the outer surface of the armature from being cooled. Even those designs that leave all or most of the outer armature face exposed make no provision for actively cooling it. Here, however, the radially disposed elastomer layer leading edges 44 are continuous, that is, they extend radially over the outer faces 28 of the armature rings 26 substantially all the way to the outer edge thereof, and they have a significant axial thickness. Moreover, they are thickest where the surface speed is greatest, that is, at the greatest radius. And, with the pulley 14 rotaring in the range of 2,000 to 4,500 ROM, the surface speed at even the relatively small radii involved here can be great. As such, the elastomer layer leading edges 44 are capable of hitring and disturbing a significant volume of ambient air, as the faces of a paddle wheel would do, and pushing it radially outwardly, as shown by the arrows in FIG. 3. More air is disturbed where the leading edges 44 are thickest, and moving faster. Simultaneously, more ambient air is drawn axially inwardly to replace that thrown radially outwardly. Because of the radially continuous nature of the leading edges 44, the moved air continually washes over and cools the armature ring outer faces 28, which are mostly exposed. Armature rings 26 that run cooler will, in turn, wear less against the pulley disk 16, and last longer in operation. The continuous cooling of the armature rings 26 is provided by structures ( the elastomer layer leading edges 44) that have an entirely independent torque cushioning function, so the cooling feature is obtained at no extra cost.

Variations in the disclosed embodiment could be made. A multi lobed armature support of unitary construction, as opposed to the layered construction shown, could provide the same self cooling feature, though without providing the torque cushioning function. For example, a drive plate of a lighter material, such as cast aluminum, with radially extending lobes of similar length and thickness to the elastomer layer 42, could support an armature on separate leaf springs riveted directly to the lobes. Such a thicker, unitary drive plate would transfer torque and support the armature equally well, but would not provide the torque cushioning that the elastomer layer 42 does. It would, however, have leading edges of comparable thickness and length, and so would provide the same cooling function as it spun. A different armature support disk design could simply provide a support for the armature ring leaf springs, with lobes that would align with and be molded to the drive plate lobes by the same type and thickness of an elastomer layer, but without the circular inner edge to pilot on the hub. Such an armature support disk would not even have to be one piece. However, it is relatively simple to produce a disk like 36, and the radial positioning that it provides removes a serious drawback that can result from flexible elastomer elements. Therefore, it will be understood that it is not intended to limit the invention to just the embodiment disclosed.

We claim:

1. An electromagnetic clutch assembly in combination with an automotive air conditioning compressor having a central drive shaft and a powered rotor supported for free rotation about said drive shaft, said powered rotor having a generally annular friction disk coaxial to said drive shaft and facing in one axial direction ralative a generative to said compressor, said clutch assembly comprising, a generally cylindrical, central hub fixed to said drive shaft, a generally annular armature of magnetic material having an outer edge with a diameter comparable to said friction disk so as to be capable of being supported in an operative position generally coaxial thereto with an outer face exposed to ambient air and an inner face axially spaced from said friction disk with a predetermined gap sufficiently small to allow said armature inner face to be electromagnetically pulled into engagement with said friction disk so as to rotate therewith when said clutch is actuated, a multi lobed, substantially rigid armature support having an inner edge fixed to said hub and a plurality of rigid, generally radially directed lobes extending continuously from said inner edge, radially outwardly and along said armature outer face to outer ends located substantially at the outer edge of said armature, each of said lobes further being sufficiently axially thick to disturb a substantial volume of ambient air as they rotate but being sufficiently narrow to leave most of said armature outer face exposed to ambient air, and, axially flexible and circumferentially and radially stiff spring means fixing said armature non turnably to said armature support lobes in said operative position such that said armature may be pulled electromagnetically against said friction disk and released to return to said operative position, whereby, when said clutch is actuated and said armature engages and rotates with said friction disk, said armature support lobes co rotate to translate power to said shaft and concurrently disturb and pull ambient air toward and into said armature outer face in fan like fashion, thereby cooling said armature.

2. An electromagnetic clutch assembly in combination with an automotive air conditioning compressor having a central drive shaft and a powered rotor supported for free rotation about said drive shaft, said powered rotor having a generally annular friction disk coaxial to said drive shaft and facing in one axial direction relative to said compressor, said clutch assembly comprising, a generally cylindrical, central hub fixed to said drive shaft, a generally annular armature of magnetic material having an outer edge with a diameter comparable to said friction disk so as to be capable of being supported in an operative position generally coaxial thereto with an outer face exposed to ambient air and an inner face axially spaced from said friction disk with a predetermined gap sufficiently small to allow said armature inner face to be electromagnetically pulled into engagement with said friction disk so as to rotate therewith when said clutch is actuated, a multi-lobed, rigid drive plate having an inner edge fixed to said hub and a plurality of rigid, generally radially directed lobes axially spaced from said armature outer face and extending continuously from said inner edge, radially outwardly to outer ends located substantially at the outer edge of said armature, said drive plate lobes being sufficiently narrow to leave most of said armature outer face exposed to ambient air, a multi lobed, rigid armature support disk located axially between said armature and drive plate, said armature support having a plurality of lobes generally congruent to said drive plate lobes, a layer of resilient elastomer integrally molded between and joining said drive plate and armature support disk lobes together, said elastomer layer being sufficiently flexible to absorb the shock of engagement between said armature and friction disk but sufficiently axially thick both to translate torque between said congruent lobes and also to disturb a substantial volume of ambient air as they rotate, and, axially flexible and circumferentially and radially stiff spring means fixing said armature non turnably to said armature support disk lobes in said operative position such that said armature may be pulled electromagnetically against said friction disk and released to return to said operative position, whereby, when said clutch is actuated and said armature engages and rotates with said friction disk, said elastomer layer cushions the shock of engagement armature as said armature support disk inner edge turns on said hub bearing surface, said drive plate and armature support disk lobes co rotate to translate power to said shaft, while, concurrently, said elastomer layer disturbs and pulls ambient air toward and into said armature outer face in fan like fashion, thereby cooling said armature.

3. An electromagnetic clutch assembly in combination with an automotive air conditioning compressor having a central drive shaft and a powered rotor supported for free rotation about said drive shaft, said powered rotor having a generally annular friction disk coaxial to said drive shaft and facing in one axial direction relative to said compressor, said clutch assembly comprising, a generally cylindrical, central hub fixed to said drive shaft, said hub having a cylindrical outer bearing surface and a radially extending shoulder, a generally annular armature of magnetic material having an outer edge with a diameter comparable to said friction disk so as to be capable of being supported in an operative position generally coaxial thereto with an outer face exposed to ambient air and an inner face axially spaced from said friction disk with a predetermined gap sufficiently small to allow said armature inner face to be electromagnetically pulled into engagement with said friction disk so as to rotate therewith when said clutch is actuated, a multi lobed, rigid drive plate having an inner edge fixed to said hub on the outside of said shoulder and a plurality of rigid, generally radially directed lobes axially spaced from said armature outer face and extending continuously from said inner edge, radially outwardly to outer ends located substantially at the outer edge of said armature, said drive plate lobes being sufficiently narrow to leave most of said armature outer face exposed to ambient air, a multi lobed, rigid armature support disk located axially between said armature and drive plate, said armature support disk having a circular inner edge piloted on said hub bearing surface in abutment with the inner side of said shoulder and also having a plurality of lobes generally congruent to said drive plate lobes, a layer of resilient elastomer integrally molded between and joining said drive plate and armature support disk lobes together, said elastomer layer being sufficiently flexible to absorb the shock of engagement between said armature and friction disk but sufficiently axially thick both to translate torque between said congruent lobes and also to disturb a substantial volume of ambient air as they rotate, and, axially flexible and circumferentially and radially stiff spring means fixing said armature non turnably to said armature support disk lobes in said operative position such that said armature may be pulled electromagnetically against said friction disk and released to return to said operative position, whereby, when said clutch is actuated and said armature engages and rotates with said friction disk, said elastomer layer cushions the shock of engagement armature, said drive plate and armature support disk lobes co rotate to translate power to said shaft, while, concurrently, said elastomer layer disturbs and pulls ambient air toward and into said armature outer face in fan like fashion, thereby cooling said armature.

* * * * *